INVENTOR.
MANUEL N. FUENTES
DUANE MORLEY COX
BY Edwin D. Grant

ATTORNEY

Sept. 9, 1969  M. N. FUENTES ET AL  3,465,966
ROCKET CONTROL
Filed Feb. 16, 1966  2 Sheets-Sheet 2

INVENTOR.
MANUEL N. FUENTES
DUANE MORLEY COX
BY Edwin D. Grant
ATTORNEY

United States Patent Office 3,465,966
Patented Sept. 9, 1969

3,465,966
ROCKET CONTROL
Manuel N. Fuentes, Brigham City, and Duane Morley Cox, Logan, Utah, assignors to Thiokol Chemical Corporation, Bristol, Pa., a corporation of Delaware
Filed Feb. 16, 1966, Ser. No. 527,963
Int. Cl. B64c 15/02
U.S. Cl. 239—265.17          1 Claim This invention relates to rocket motors and, more particularly, to an improved device for varying the thrust vector of a rocket motor.

By means of the invention disclosed herein the thrust vector of a rocket motor can effectively be varied as a result of mechanical interruption of the flow of exhaust gas through the thrust nozzle of the rocket motor combined with injection of fluid into said exhaust gas. More particularly, in a preferred embodiment of the invention that is described in detail hereinafter, one end of a shaft can be selectively moved into the exhaust stream passing through the thrust nozzle of a rocket motor, producing a shock wave upstream from the projecting end of said shaft that exerts a lateral force against the wall of said thrust nozzle, and simultaneously fluid can be injected from the end of said shaft to amplify this shock wave. It is a particularly advantageous feature of the preferred embodiment of this invention that the aforementioned shaft thereof can be rapidly moved into and out of the exhaust stream passing through said thrust nozzle, and that the flow of fluid from the end of said shaft is automatically maintained at a relatively low rate when the shaft is retracted therefrom.

Accordingly, it is a broad object of this invention to provide an improved device for controlling the thrust vector of a rocket motor.

Another object of this invention is to provide an improved device for deflecting the flow of exhaust gas through the thrust nozzle of a rocket motor by a combination of mechanical means and injection of fluid into said exhaust gas.

An additional object of this invention is to provide means for varying the thrust vector of a rocket motor which comprises components that will not bind when subjected to the high temperature and adverse environmental conditions of the thrust nozzle of a rocket motor.

A further object of this invention is to provide means for rapidly changing the thrust vector of a rocket motor.

Still another object of this invention is to provide a thrust vector control device for moving the end of a shaft into and out of the exhaust stream flowing through the thrust nozzle of a rocket motor by means of variation of the pressure in a single hydraulic conduit connected to said device.

Still another object of this invention is to provide means for ejecting a variable amount of coolant from the end of a shaft which is movable into the exhaust stream flowing through the thrust nozzle of a rocket motor, the amount of coolant that is ejected from the shaft depending upon its position relative to the thrust nozzle.

These and other objects, features and advantages of the present invention will be readily understood from a careful consideration of the following detailed description of a preferred embodiment thereof, reference being taken to the accompanying drawings wherein.

Throughout the specification and drawings like reference numbers refer to like parts.

Figure 1:
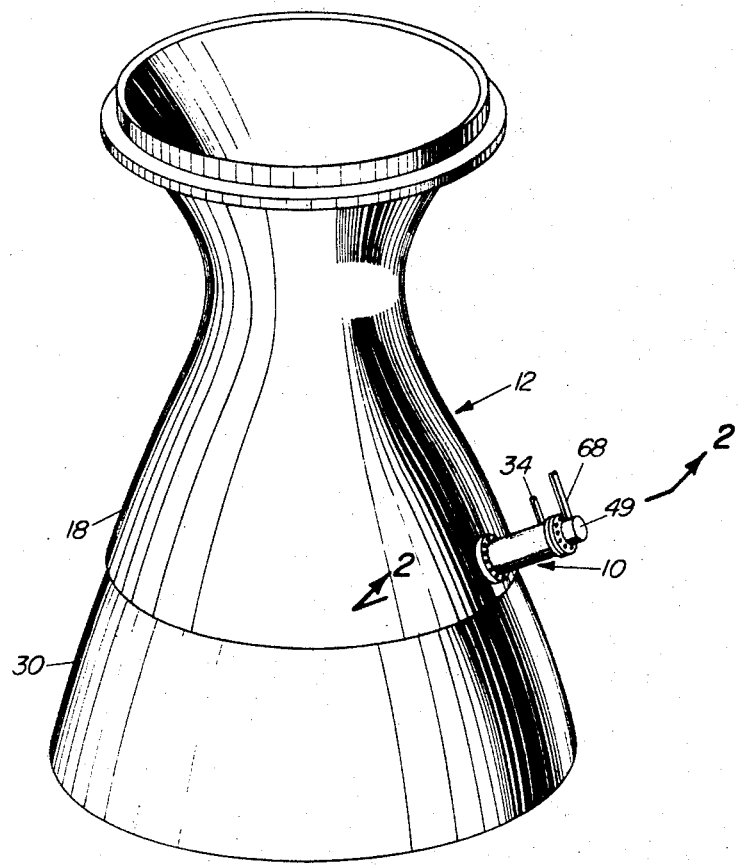
FIGURE 1 is a pictorial view illustrating a rocket motor thrust nozzle with the preferred embodiment of the invention mounted thereon.
Figure 2:
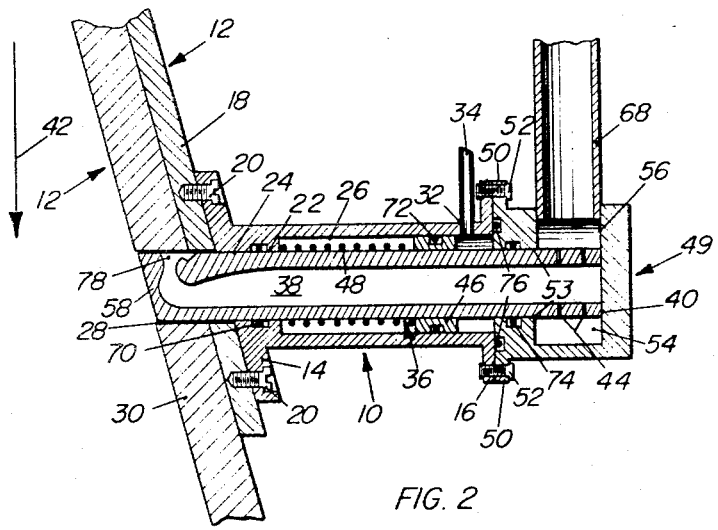
FIGURE 2 is a longitudinal sectional view of the preferred embodiment, taken along the plane represented by line 2—2 of FIG. 1 and illustrating the relation of its components as they appear before the device is actuated.

As illustrated in FIG. 1 a preferred form of this invention comprises a cylindrical housing fixedly mounted on a rocket motor thrust nozzle and projecting from the outer surface thereof, these components being respectively designated by the numbers 10 and 12. More particularly, as can be seen in FIG. 2 housing 10 includes integral, circumferentially-extending flanges 14, 16 at opposite ends thereof, flange 14 being attached to the metallic outer portion 18 of thrust nozzle 12 by means of a plurality of bolts 20. The passage through housing 10 has a lesser diameter at the portion thereof disposed adjacent thrust nozzle 10, thus forming an inwardly-extending shoulder 22 in said passage. For the purpose of identification herein, that portion of the passage through housing 10 having a lesser diameter will be referred to as aperture 24 of the housing, and that portion of said passage having a greater diameter will be referred to as counterbore 26. Housing 10 is substantially coaxial with an aperture 28 extending through both the outer portion 18 and the inner, rearwardly-extending portion 30 of thrust nozzle 12. That is to say, the common longitudinal axis of aperture 24 and counterbore 26 of housing 10 is substantially coincident with the longitudinal axis of aperture 28 in the wall of thrust nozzle 12. Housing 10 is provided with a port 32 adjacent the end thereof that is remote from the thrust nozzle 12 (which end of housing 10 will hereinafter be referred to as the free end of the housing), and a duct 34 is fixedly engaged within this port. Duct 34 is also connected to conventional means (not shown) such as a spool valve of suitable design, for injecting hydraulic fluid through said duct and into counterbore 26 of housing 10. For a reason which will become manifest hereinafter, the aforementioned pressurizing means must also allow the hydraulic fluid to pass out of housing 10 through port 32 and duct 34 connected therewith at selected times. Since there are many devices which are capable of injecting hydraulic fluid through duct 34 into housing 10 and thereafter allowing this fluid to flow out of said housing, and since such devices are well-known in the art, it is not believed necessary to illustrate a particular pressurizing means in the drawings.

Figure 3:
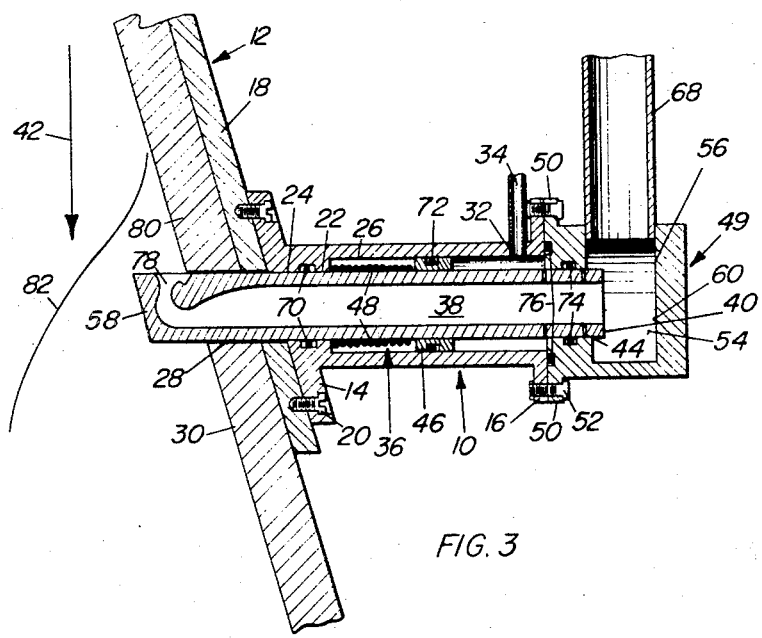
FIGURE 3 is a longitudinal sectional view of the preferred embodiment, taken along the same plane as in FIG. 2 and illustrating the relation of its components as they appear after the device is actuated.

As illustrated in FIG. 2, a cylindrical shaft, generally designated by the number 36, is disposed within counterbore 26 of housing 10, slidably engaged within aperture 24 of said housing, and disposed within aperture 28 in the wall of thrust nozzle 12. Shaft 36 includes a passage 38 which extends from the outer (i.e., remote from thrust nozzle 12) end surface 40 of said shaft to a point that is adjacent the inner end of said shaft and on the upstream side thereof, the flow direction of the thrust gas passing through thrust nozzle 12 being indicated in both FIGS. 2 and 3 by an arrow designated by the number 42. A plurality of circumferentially-spaced inlet ports 44 extend through the wall of shaft 36 adjacent said outer end surface 40.

An annular piston 46 is fixedly positioned around shaft 36 between the ends thereof, the peripheral surface of this piston being slidably engaged with the inner surface of housing 10. One end of a spring 48 is positioned against shoulder 22 of housing 10 and the other end of this spring is positioned against piston 46 to thereby bias said piston, and shaft 36 connected thereto, toward the free end of said housing.

Fixedly secured to the flange 16 on the free end of housing 10 is a cylindrical cap generally designated by the number 49. More particularly, cap 49 is provided with a circumferentially extending flange 50 that is secured to flange 16 of housing 10 by means of a plurality of bolts 52. Cap 49 also includes a hole 53 in which the outer end of shaft 36 is slidably engaged, an internal chamber 54 in communication with said hole, and an inlet port 56 in communication with said chamber. When shaft 36 is in an inoperative position, its inner end surface 58 is flush with the inner surface of portion 30 of thrust nozzle 12, and its outer end surface 40 is resiliently biased toward, and rests against, the rear wall 60 of chamber 54 of cap 49 by means of spring 48.

One end of a duct 68 is fixedly engaged within inlet port 56 of cap 49, the other end of this duct being connected to means (not shown) for passing coolant through the duct and into chamber 54 under pressure. Since there are many devices that can be used to inject coolant into chamber 54, such as pumps or pressurized tanks and the like, it is not believed necessary to illustrate a particular means in the drawings.

A seal ring 70 is positioned in a circumferentially-extending groove formed in the wall of aperture 24 of housing 10 to seal the slidably engaged surfaces of said housing and shaft 36, and another seal ring 72 is positioned in a circumferentially-extending groove formed in the peripheral surface of piston 46 to seal the slidably engaged surfaces of said housing and said piston. Likewise, a seal ring 74 is positioned in a circumferentially-extending groove formed in the wall of hole 53 of cap 49 to seal the slidably engaged surfaces of said cap and shaft 36. The abutting surfaces of flange 16 of housing 10 and flange 50 of cap 49 are also sealed by a seal ring 76 positioned in an annular groove formed in said cap.

It will be obvious to those skilled in the art of rocket motors that the above-described components of the preferred embodiment of the invention may be formed of a great variety of materials. However, it will be recognized that shaft 36 should preferably be formed of a material, such as a molybdenum alloy, that can withstand the high temperature of the exhaust gas that passes throug trust nozzle 12.

A valve (not shown) is preferably placed in duct 68 and arranged to block the flow of coolant therethrough until the rocket motor associated with thrust nozzle 12 is fired. Initially the components of the described thrust vector control device are in the configuration illustrated in FIG. 2, with the outer end surface 40 of shaft 36 engaged with the rear wall 60 of chamber 54 of cap 49. When the rocket motor is fired and thrust gas thereof flows through thrust nozzle 12, coolant is permitted to enter chamber 54 through the duct 68 connected thereto. This coolant is under relatively high pressure and flows through inlet ports 44 in shaft 36 into the passage 38 therein, and thus passes to the orifice portion 78 of said passage and flows between the peripheral surface of said shaft 36 and the wall of aperture 28 in thrust nozzle 12, said surface and wall being spaced apart slightly to permit the fluid passage 38 to escape therefrom when shaft 36 is in its retracted position. Thus the described embodiment of the invention provides for continuous cooling of shaft 36 after the rocket motor is fired.

When alteration of the thrust vector of the rocket motor is desired, hydraulic fluid is introduced through duct 34 into housing 10 (more specifically, into that portion of counterbore 26 in said housing between piston 46 and the inwardly-extending portion of the end surface of cap 49 that abuts flange 16 of said housing). The pressure thereby exerted against the face of piston 46 moves the piston and shaft 36 toward the longitudinal axis of thrust nozzle 12, whereby the inner end of shaft 36 is moved into the exhaust stream flowing through said thrust nozzle, as, for example, to the position illustrated in FIG. 3. However, since the force applied to piston 46 by the hydraulic fluid within housing 10 is opposed by the force exerted against said piston by spring 48, the distance that the inner end of shaft 36 is extended from the inner surface of thrust nozzle 12 depends upon the fluid pressure within housing 10. Thus the position of shaft 36 can conveniently be controlled by varying the pressure of the hydraulic fluid injected into housing 10 through the single duct 34. When the outer end surface 40 of shaft 36 disengages from the rear wall 60 of chamber 54 of cap 49, coolant introduced into chamber 54 from duct 68 flows through the outer end of the passage 38 in shaft 36 and is thus injected into the gas stream through the orifice portion 78 of said passage. The injected coolant is directed, because of the illustrated orientation of the orifice portion 78 of passage 38, in a direction opposite to the direction of flow of the exhaust gas through thrust nozzle 12 and therefore amplifies the shock wave produced by the projecting end of shaft 36. The orifice portion 78 of passage 38 in shaft 36 forms a venturi-type nozzle so that coolant is injected into the exhaust stream flowing through thrust nozzle 12 in the form of a divergent conical jet. This coolant not only carries heat away from the end of shaft 36 but also shields the end of said shaft from particulate matter in the exhaust stream that would otherwise be coated on the shaft and interfere with its retraction into aperture 28. Since the coolant injected into the exhaust stream is not intended to be the primary means for creating a shock wave in said exhaust stream but only as a means of amplifying the shock wave produced by shaft 36, large quantities of fluid are not required.

When alteration of the thrust vector of the rocket motor is no longer required, the pressure applied to the hydraulic fluid in counterbore 26 is decreased, permitting spring 48 to move piston 46 toward cap 49 and force the hydraulic fluid out of housing 10 through duct 34, and returning shaft 36 to the position thereof that is illustrated in FIG. 2. Thus the flow of coolant through the outer end of passage 38 is cut off, although, as mentioned hereinbefore, a small amount of coolant continues to pass through inlet ports 44 in shaft 36. It will be noted that the position of shaft 36 relative to thrust nozzle 12 (and to the exhaust stream therein) can be controlled independently of the flow of coolant through said shaft, and that movement of said shaft 36 may be accomplished by varying the pressure in only a single conduit, namely, duct 34, connected to the described device. Since the pressure within counterbore 26 can rapidly be varied by conventional means connected to duct 34 to control the position of shaft 36, the exhaust stream flowing through thrust nozzle 12 can rapidly be deflected to thereby change the thrust vector of the rocket motor in which the preferred embodiment of the invention is utilized.

It will be obvious that where thrust vector control is required for a rocket motor having a single thrust nozzle, four or more devices of the type illustrated in the drawings and described hereinabove would be circumferentially spaced around the thrust nozzle. Furthermore, it will be recognized that many modifications of the present invention are possible in the light of the disclosure presented herein. For example, shaft 36 could be made of two pieces so that its orifice end could be interchangeable to provide different angles of injection of fluid into a thrust nozzle or different orifice sizes. Therefore, it is to be understood that the scope of the invention is limited only by the terms of the subjoined claim.

What is claimed is:

1. In a rocket motor having a thrust nozzle, a device for varying the thrust vector of said rocket motor comprising:
   a cylindrical housing fixedly mounted on the wall of said thrust nozzle and projecting from the outer surface thereof, said housing being coaxial with an aperture in the wall of said thrust nozzle and having a port extending through the wall thereof at a point adjacent its free end;

a shaft disposed within said housing and said aperture in the wall of said thrust nozzle, a passage extending from the outer end surface of said shaft to a point located adjacent the other end of said shaft and on the upstream side thereof, at least one inlet port extending through the wall of said shaft adjacent the outer end thereof;

an annular piston fixedly positioned around said shaft intermediate the ends thereof, the peripheral surface of said piston being slidably engaged with the inner surface of said housing;

a cap fixedly mounted on the free end of said housing and including a hole in which the outer end of said shaft is slidably engaged, an internal chamber which communicated with said orifice, and an inlet port which extends through the wall of said cap and communicates with said chamber;

spring means positioned within said housing and resiliently biasing the outer end surface of said shaft toward the rear wall of said chamber in said cap;

means for injecting coolant into said chamber through said inlet port therein, said coolant passing through said inlet port in said shaft when the outer end surface of said shaft is engaged with said rear wall of said chamber in said cap; and means for injecting pressurized fluid into said housing through said port therein to thereby move said piston and shaft connected therewith toward the longitudinal axis of said thrust nozzle, said means being adapted to selectively allow said fluid to pass out of said housing through said port therein so that said spring means can move the outer end surface of said shaft against said rear wall of said chamber in said cap.

References Cited

UNITED STATES PATENTS 3,233,833   2/1966   Bertin et al. _____ 239—265.23

EVERETT W. KIRBY, Primary Examiner

U.S. Cl. X.R.

239—127.3, 265.23